United States Patent [19]
Makeham

[11] 3,848,399
[45] Nov. 19, 1974

[54] SUGAR CANE HARVESTERS

[75] Inventor: Sam Robert Makeham, Bundaberg, Australia

[73] Assignee: Massey-Ferguson (Australia) Limited, Sunshine, Victoria, Australia

[22] Filed: Apr. 30, 1973

[21] Appl. No.: 355,860

[30] Foreign Application Priority Data
May 6, 1972    Great Britain.................... 21201/72

[52] U.S. Cl.................................... 56/13.9, 56/295
[51] Int. Cl............................................ A01d 45/10
[58] Field of Search........ 56/295, 13.9, 14.3, 53–62, 56/157, 255

[56] References Cited
UNITED STATES PATENTS

| | | | |
|---|---|---|---|
| 2,916,867 | 12/1959 | Chadwick | 56/295 |
| 3,010,269 | 11/1961 | Maguire | 56/295 |
| 3,158,978 | 12/1964 | Brewer | 56/295 |
| 3,225,527 | 12/1965 | Spear | 56/12.1 |
| 3,550,360 | 12/1970 | van der Lely | 56/6 |
| 3,645,075 | 2/1972 | Kappelman et al. | 56/28 |
| 3,673,774 | 7/1972 | Mizzi | 56/13.9 |

*Primary Examiner*—Russell R. Kinsey

[57] ABSTRACT

Sugar cane harvester having twin contra-rotating base cutters feeding whole sticks to cane chopping apparatus which subdivides the sticks. Each base cutter is in the form of a drum, open at one end and arranged with its open end facing downwards. Outwardly projecting blades are mounted at the open end of the drum. The blades are thereby downwardly offset from the closed end of the drum which reduces power consumption and causes less soil and stones to be fed into the harvester with the cane sticks.

6 Claims, 7 Drawing Figures

SUGAR CANE HARVESTERS

This invention relates to sugar cane harvesters, and in particular to the base cutters of sugar cane harvesters, whereby the sugar canes are severed from their roots.

During the development of sugar cane harvesters various forms of base cutters have been tried, of which there are two principal kinds, namely those using a single large diameter rotatable cutter disc and those using twin contra-rotating cutters.

The twin contra-rotating base cutters have overriding advantages over the single disc cutters, but they do suffer from the disadvantages that their power requirements are rather high and that they tend to direct foreign matter such as stones soil and cane roots into the harvester with the harvested cane. Such foreign matter is a particular problem in cane harvesters which chop or otherwise cut the cane into pieces since it can damage the chopping or cutting mechanism, and in any case has to be separated from the cane before the cane is processed to remove its sugar. This separation is therefore effected before subdivision of the cane and adds considerably to the complexity of the harvester.

The disadvantages referred-to in the preceding paragraph arise partly from the fact that twin cutters usually cut the cane as it passes between the cutters instead of cutting the cane at the most forward point of the cutting circle of the cutter as usually occurs in the case of single disc type cutters. In consequence, when twin cutters are used with their axes of rotation extending forwards and upwards and with the cutters arranged to sever the cane a little below ground level (as is desirable), the foremost portions of the cutters necessarily have to dig deeper into the soil than the depth at which the cane is cut, whereas this is not the case with single disc cutters. The disadvantages also arise partly from the fact that the direction of movement of the cutting portions of twin base cutters as they sever the canes is more or less directly towards the crop inlet of the harvester whereas this is usually not the case with single disc cutters.

An object of the present invention is to overcome or reduce either or both of the disadvantages referred-to above.

In view of the foregoing, it will be appreciated that this invention relates to a problem specific to sugar cane harvesters, particularly those which chop or otherwise cut the cane into pieces. This problem does not arise in other ground treatment or crop treatment or harvesting machines in which the requirement to cut a thick wood-like crop below the surface of sun-baked stony soil and feed only the crop into the machine does not arise. More particularly, it will be appreciated that this invention relates to a problem which does not arise in cane-cutting machines using single disc cutters, such as the machine disclosed in Australian patent specification 164,322.

According to the invention there is provided a mobile sugar cane harvester comprising a pair of crop-gathering members defining a crop-receiving throat, a pair of cane cutters connectible to a drive train whereby the cutters may be contra-rotated about respective upwardly-extending axes to sever canes as the canes pass through the throat, each cane cutter comprising a blade support member adapted to be coupled to said drive train, the outer portion of said blade support member extending axially with respect to the axis of rotation of said cutters and downwardly, and a blade-mounting at the periphery of said blade support member whereby a blade may be mounted thereon at a position downwardly offset from at least the inner portion of the blade-support member.

An embodiment of the invention will now be described by way of example with reference to the accompanying drawings in which.

Figure 1:
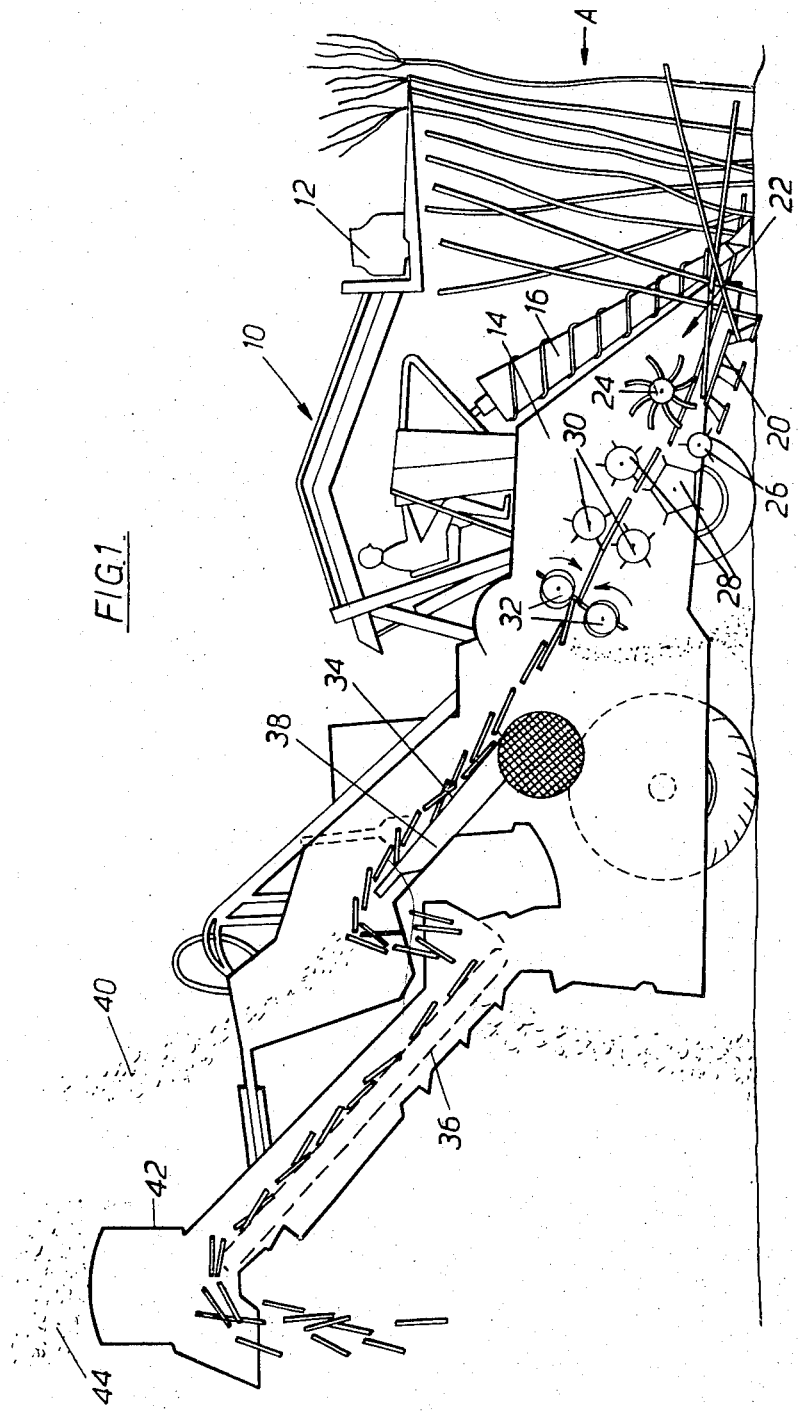
FIG. 1 is a diagrammatic sectioned side view of a sugar cane harvester according to the invention.
Figure 2:
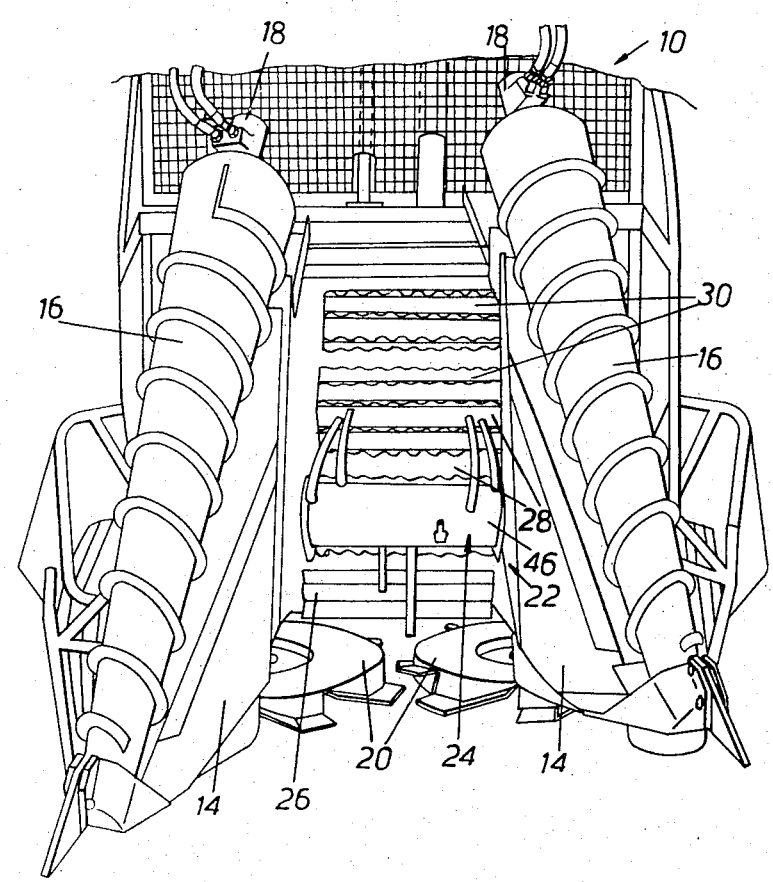
FIG. 2 is a perspective front elevation view, on arrow A in FIG. 1, of the harvester.

Referring to FIGS. 1 and 2, a cane harvester 10 comprises a cane topping unit 12 to remove the cane tops before the cane is fed into the harvester. A pair of height-controllable crop gathering walls 14, each surmounted by a concial auger 16 driven by a hydraulic motor 18, define a crop-receiving throat.

A pair of power-driven contra-rotatable cane base cutters 20 is provided in the throat to sever canes from their roots a little below ground level and feed them inwardly. The base cutters are arranged to be rotated about axes which extend simultaneously upwards and forwards with respect to the direction of normal forward motion of the harvester and towards each other.

To assist the feed of cut cane inwardly, a series of rotary cane feed members 22 is provided comprising a rotary comb roller 24, a butt-lifter roller 26 and two pairs 28, 30 of contra-rotating rollers having corrugated paddle-like feed elements. These feed members also serve to remove stones, soil and other foreign matter from the cane.

A pair of contra-rotating cane choppers 32 receive the cane from the rollers 30, chop it into billets and throw it onto a primary scraper-type elevator 34. As the billets fall off the top end of elevator 34 onto the inlet of a secondary scraper-type elevator 36 they are subjected to an air blast from a blower 38 to remove cane trash 40. The cane falls from the top end of elevator 36 into a trailer (not shown) and is simultaneously subjected to an air current produced by a fan unit 42 to remove any remaining trash 44.

Rotary comb 24 comprises a drum 46 having eight curved prongs affixed thereto at positions around the drum lying on a common helix. The prongs comb out tangled cane and assist its passage into the harvester.

Figure 3:
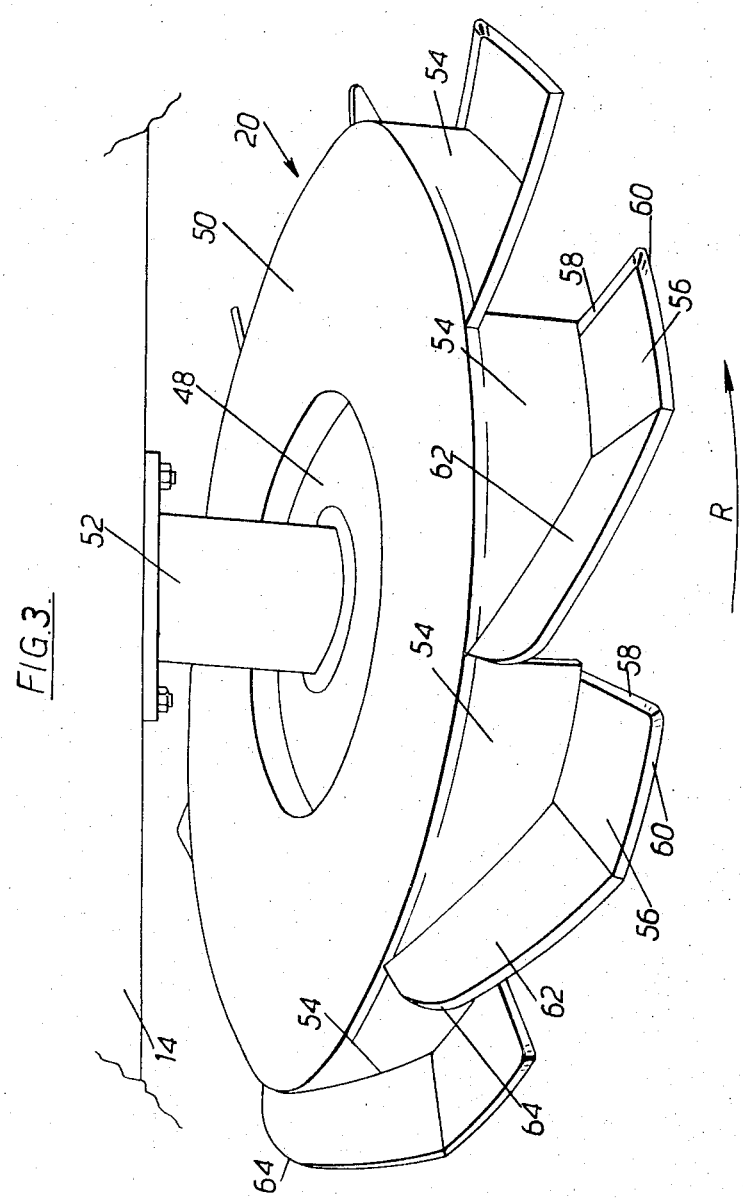
FIG. 3 is an enlarged perspective view of one of the cane cutters of the harvester of FIGS. 1 and 2.
Figure 4:
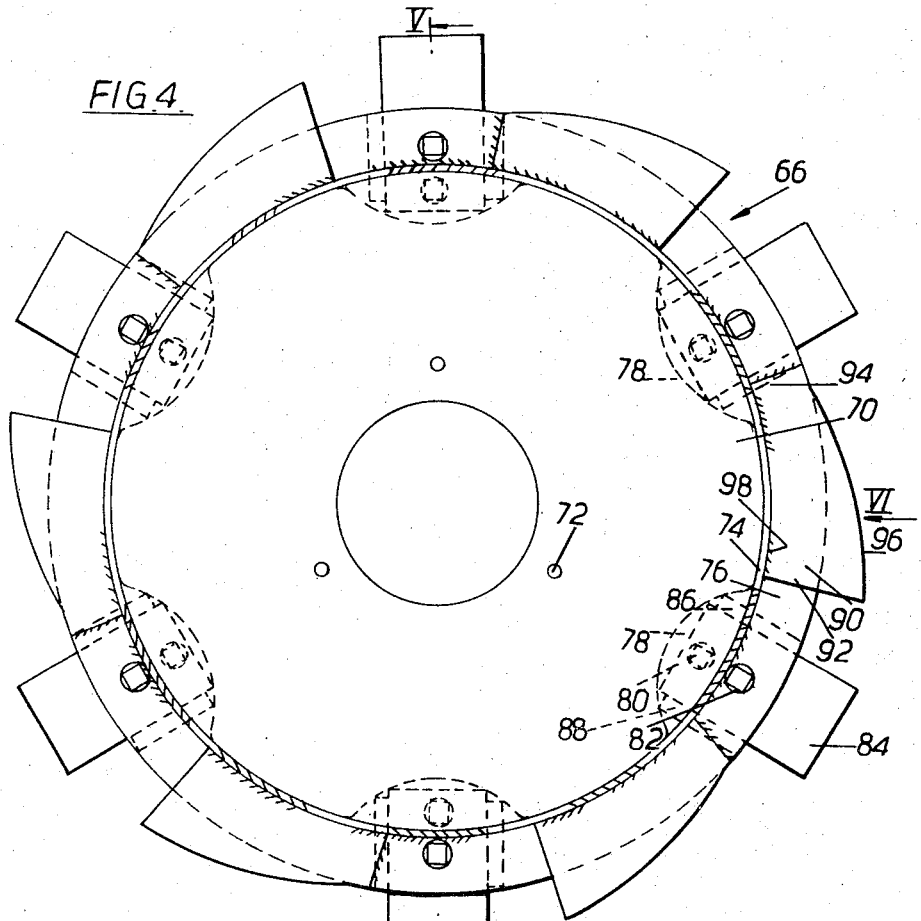
FIG. 4 is a plan view of an alternative cane cutter suitable for use in the cane harvester of FIGS 1 and 2.

Referring to FIG. 3, each cane base cutter comprises a drive input member constituted by a dished central hub portion 48 of a blade-support disc 50. Hub 48 is drivably coupled to a downwardly extending drive transmission shaft (not shown) housed within a flanged tubular member 52 which is bolted to the underside of the respective gathering wall 14 of the harvester.

Disc 50 has eight blade-mounting flanges 54 welded to its underside at equally spaced positions around its circumference, each constitiuting part of a common cylinder coaxial with the shaft within tubular member 52. Disc 50 and flanges 54 together constitute a blade support member.

Each flange 54 has a blade 56 in the form of a rectangular plate 56 secured to its lower edge. Blades 56 are each sharpened by means of a single chamfer formed along their leading edges 58 (with respect to rotation in the direction of arrow R) and along their adjacent outer edges 60.

A ramp 62 extends circumferentially with respect to disc 50 from the trailing edge of each blade 56 up to the level of the upper surface of the disc. Each ramp is welded to its respective flange 54 and rounded at its upper radially outer corner 64.

Each ramp 62 defines the limit in one direction of the circumferential extent of its respective flange 54, and there is a generally triangular gap between the trailing edge of one flange and the vertical leading edge of the next.

In use, gathering walls 14 are lowered until blades 56 cut into the soil to the required depth. Owing to the forward and upward inclination of the axes of rotation of the cutters each blade enters the ground only in the forward part of each revolution. The blades sever the cane butts from their roots whereupon the butts are lifted onto disc 50 by ramps 62 and thereby fed rearwardly through the throat of the harvester. The cane butts are lifted by roller 26 and fed rearwardly by rollers 28, 30 to choppers 32 as previously described.

In the embodiment of FIGS. 4 to 7 a pair of base cutters 66, 68 is mounted and arranged on a cane harvester substantially as described above in connection with FIGS. 1 to 3.

Each base cutter 66, 68 comprises a drive input and blade-support member in the form of a first annular disc 70 having apertures 72 whereby it may be coupled to a drive shaft (not shown). A cylindrical flange 74 is welded to the underside of disc 70 at its outer periphery.

A second annular disc 76 is welded to the lower edge of flange 74 so as to lie in a plane parallel to disc 70. The inner peripheral edge of annular disc 76 is formed with six equally spaced inwardly-projecting part-circular lips 78 for a purpose to be described.

Two radially aligned countersunk square-section apertures 80, 82 are punched in disc 76 at each lip 78 whereby an apertured cane-cutting blade 84 may be detachably bolted thereto by means of appropriate square-necked bolts and associated nuts (not shown). A pair of metal strips 86, 88 is welded to disc 76 so as to be one at each side of each blade 84. The strips function as guides when inserting the blades, and as wear members providing some protection for the blades during use of the cutters. The strips also serve to reinforce the blade mounting.

Figure 5:
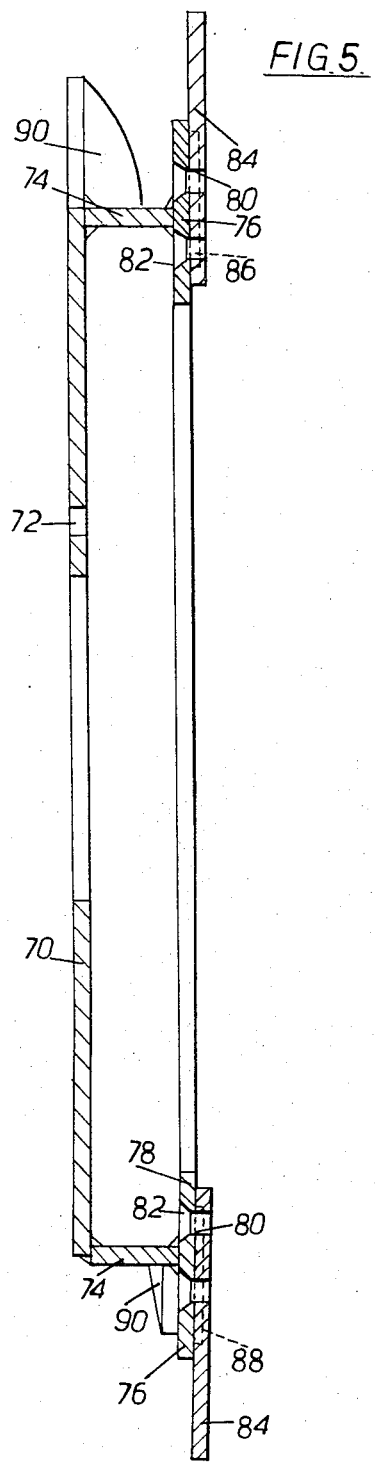
FIG. 5 is a section through the cutter of FIG. 4 on the line V—V in FIG 4.

As can be seen in FIG. 5, blades 84 are mounted at positions downwardly offset from disc 70 so that, in use, though the blades pass below soil level in the forward part of their cutting circle, there is no necessity for the disc 70 to penetrate the soil, and the disc defines a relieved zone between its underside and the ground in which the disc does not contact the ground.

Figure 7:
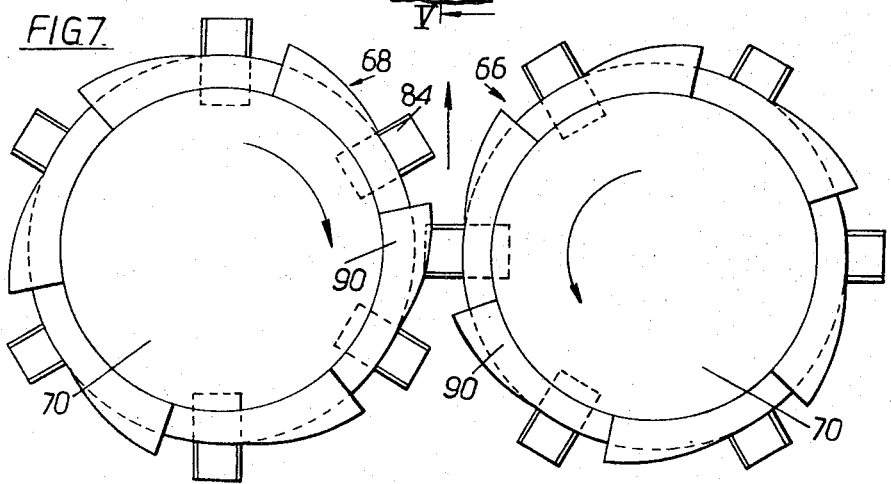
FIG. 7 is a diagrammatic plan view showing a pair of cutters as illustrated in FIGS. 4 to 6, in their working relationship as when mounted on a sugar cane harvester.
Figure 6:
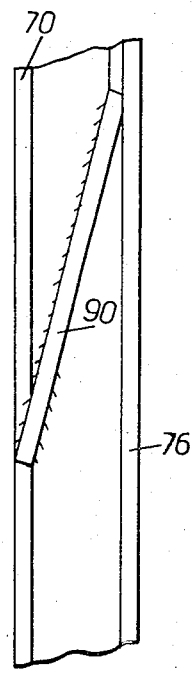
FIG. 6 is a side elevation of a portion of the cutter of FIG. 4 as seen along arrow VI in FIG. 4.

Between each pair of blades 84 there is provided a ramp 90 extending (as shown in FIG. 6) from the level of the upper surface of lower disc 76 to the level of upper disc 70. Each ramp tapers in width from its trailing end 92 towards its leading end 94. At its leading end, each ramp is of the same width, measured in the readial direction, as annular disc 76 (apart from lips 78) and at its trailing end is approximately twice as wide. The outer edge 96 of the ramp is smoothly curved and face-hardened. The leading end 94 of the ramp is welded to disc 76, and the inner edge 98 is curved to correspond with the curvature of flange 74 and is welded thereto. It will be noted that the radially outer corner of the trailing end 92 of each ramp is of only slightly less radial distance from the axis of the cutter 66 than the outer edge of each blade 84. As shown in FIG. 7, the arrangement of the ramps 90 on cutters 66 is the inverse of that on cutter 68 to take account of the difference in direction of rotation.

In use, the harvester travels in the direction from bottom to top in FIG. 7, as indicated by the arrow between the cutters, and the cutters 66, 68 contra rotate as indicated by their arrows. Cane is severed by blades 84 and the butts of the cane sticks are raised by ramps 90 onto discs 70 whereby the cane is fed butt first into the harvester. The cutters 66, 68 are driven in timed relationship so that each blade 84 on one cutter passes midway between a pair of blades of the other cutter and below the middle and trailing end portion of the ramp 90 between that pair of blades. The cutters 66, 68 are vertically offset by approximately a quarter of an inch to prevent the blades 84 clashing when one of the shear bolts (not shown) in the drive thereto shears, resulting in loss of synchronism. A shear bolt is provided in the drive train to each cutter to prevent damage to the drive train when overload occurs.

It will be appreciated that, as the cutters 66, 68 rotate and cut the cane in the nip between the cutters, the butts of the severed canes will be in an area which is constantly being traversed by the ramps 90 of one or other of the cutters. Therefore the butt of each severed cane stick, irrespective of which cutter severed it from its roots, will be raised onto the disc 70 of one or other of the cutters and fed into the harvester.

Among other advantages provided by the embodiments described above are:

1. less power is required to drive the cutters 20 and 66, 68 because the discs 50 and 70 do not penetrate the ground;

2. the blades 56 and 84 are downwardly offset from the discs 50 and 70 and soil, stones and the like disturbed by the blades tends to pass under the discs instead of over them and therefore less of this foreign matter enters the harvester with the cane;

3. the ramps 62 and 90 lift cane butts onto the disc 50 thereby improving cane feeding;

4. for any given depth of cut, disc 50 is at a higher position than the discs of previous cane harvesters with respect to butt lifter roller 26. This reduces the tendency for canes to spear down into the ground between the cutters and the roller 26, and enables a fixed sill plate, which is otherwise needed to prevent this, to be dispensed with. The space left by the sill plate allows the escape of more trash and foreign matter than hitherto, and the absence of the sill plate eliminates the operational problems, such as jamming of the cutters, caused by the plate.

Among the modifications which can be made in the embodiments described above while still falling within the scope of the invention are the use of a conical or dome-shaped blade support member instead of a drum-shaped member.

Alternatively the blade support member may be in the form of a spider having two or more outwardly projecting arms, the arms being bent downwards at their ends of carrying flanges whereby the blades are mounted on the arms at downwardly offset positions. Where such a blade support member is provided, stones and soil etc., can escape between the arms thereby producing a cleaner harvested crop. Also the arms provide some elasticity to cushion shock otherwise transmitted to the cutter drive train when an obstruction, e.g., a rock is encountered.

What is claimed is:

1. In a mobile sugar cane harvester comprising ground wheels, a body portion supported on said ground wheels, a pair of crop gathering members defining a crop-receiving throat, said crop gathering members being mounted on said body portion, and a pair of cane cutters mounted on said body portion, said cane cutters being connected to a drive train whereby the cutters may be contra-rotated about respective upwardly-extending axes to sever canes as the canes pass through the throat, each cane cutter comprising a blade support member, said blade support member being coupled to said drive train, and a blade mounted at the periphery of said blade support member; the improvement wherein said blade support member comprises a flat disc, and a flange, said flange being fixed to the periphery of said disc and extending axially downwardly therefrom with respect to the axis of rotation of said cutters, said blade being mounted at the lower edge of said flange and downwardly offset from at least the inner portion of said blade support member and wherein said flange is in the form of a cylinder, said cylinder and said disc together defining a drum-shaped structure.

2. In a mobile sugar cane harvester comprising ground wheels, a body portion supported on said ground wheels, a pair of crop gathering members defining a crop-receiving throat, said crop gathering members being mounted on said body portion, and a pair of cane cutters mounted on said body portion, said cane cutters being connected to a drive train whereby the cutters may be contra-rotated about respective upwardly-extending axes to sever canes as the canes pass through the throat, each cane cutter comprising a blade support member, said blade support member being coupled to said drive train, and a blade mounted at the periphery of said blade support member; the improvement wherein said blade support member comprises a flat disc, and a flange, said flange being fixed to the periphery of said disc and extending axially downwardly therefrom with respect to the axis of rotation of said cutters, said blade being mounted at the lower edge of said flange and downwardly offset from at least the inner portion of said blade support member and a ramp at the periphery of said disc, said ramp extending along a portion of the periphery of said disc, said ramp having its leading end at the level of said blade and adjacent to the trailing edge of said blade, and said ramp having its trailing end at the level of said disc.

3. The sugar cane harvester of claim 2 wherein the radially outermost point of the leading edge of said ramp is spaced inwardly from the radially outer edge of said blade.

4. The sugar cane harvester of claim 2 wherein the trailing end of said ramp is wider, measured in a radial direction with respect to said cutter than the leading end of said ramp.

5. The sugar cane harvester of claim 2 wherein each cutter carries a series of blades, a ramp being provided between each pair of blades, the trailing edge of each ramp being spaced along the periphery of said cutter from the leading edge of the next blade.

6. The sugar cane harvester of claim 2 wherein said cutters are driven in timed relationship and part of a blade of one cutter passes below a ramp of said other cutter.

* * * * *